United States Patent [19]

Otis

[11] Patent Number: 4,552,323

[45] Date of Patent: Nov. 12, 1985

[54] CABLE DISPENSING APPARATUS

[76] Inventor: John F. Otis, 11 Power Rd., Westford, Mass. 01824

[21] Appl. No.: 659,640

[22] Filed: Oct. 11, 1984

[51] Int. Cl.$^4$ .................. B65H 75/40; B65H 49/00
[52] U.S. Cl. .......................... 242/865 R; 242/129.5
[58] Field of Search ............... 242/86.5, 86.52, 129, 242/129.7, 129.72, 130, 130.2, 79, 134

[56] References Cited

U.S. PATENT DOCUMENTS

| | | | |
|---|---|---|---|
| 2,229,787 | 1/1941 | Abbott | 242/86.5 R |
| 2,690,884 | 10/1954 | Beck | 242/86.51 |
| 3,304,025 | 2/1967 | Zerg | 242/129 |
| 3,485,458 | 12/1969 | Evans | 242/129.72 X |
| 3,827,650 | 8/1974 | Stevens | 242/86.5 R |
| 3,831,877 | 8/1974 | Bennett et al. | 242/129 X |
| 3,912,225 | 10/1975 | Earnheart | 242/86.5 R X |
| 3,982,402 | 9/1976 | Lang et al. | 242/54 R X |
| 3,984,064 | 10/1976 | Bartelt | 242/129 |
| 4,202,509 | 5/1980 | Horn | 242/129 X |

Primary Examiner—Stuart S. Levy
Assistant Examiner—Lloyd D. Doigan
Attorney, Agent, or Firm—Robert T. Dunn

[57] ABSTRACT

A cable dispenser stores and dispenses cable from one of several coils of cable held on separate interchangeable cable coil holding reels stacked one above another on shelves on a cart each reel including a spool on a turntable platform that has four outside corners providing four points of support therefor, at least two shelves on the cart spaced apart one above another a distance sufficient to clear the height of a reel loaded with a coil of cable, each shelf holding one loaded reel at the four points of support therefor, in a position from which cable can be dispensed from the outside of the coil held thereby. The cart shelves above the bottom shelf is sufficiently open at the center thereof that loaded reels can be lifted from the cart or placed on the cart through the center openings in the shelves above, for easy loading and unloading of the cart. In a preferred embodiment, a cable guide is provided on the cart having a cable entrance and exit through which the cable from the outside of one of the reels loaded on the cart is fed and emerges essentially straight and free of spirals or kinks.

6 Claims, 7 Drawing Figures

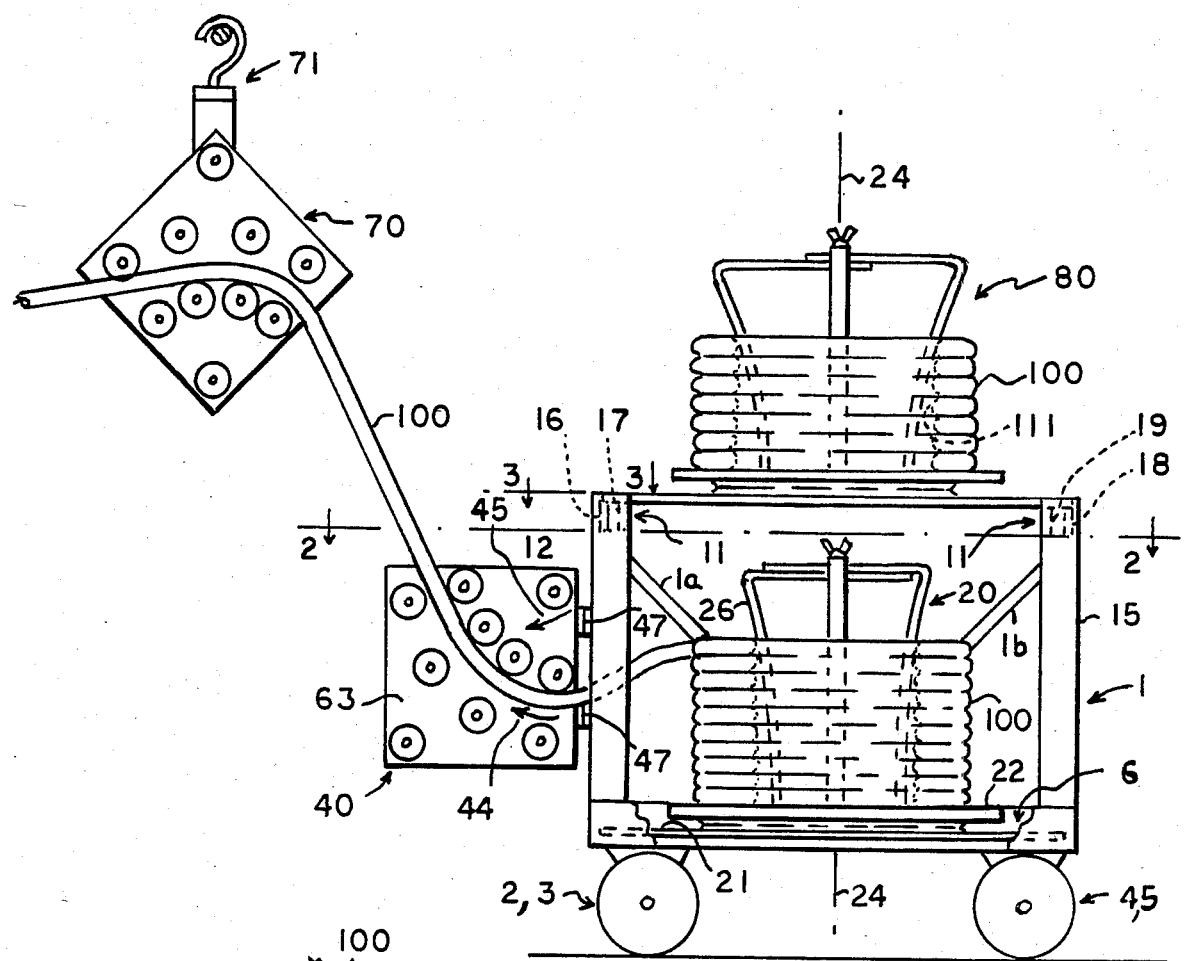
FIG 1
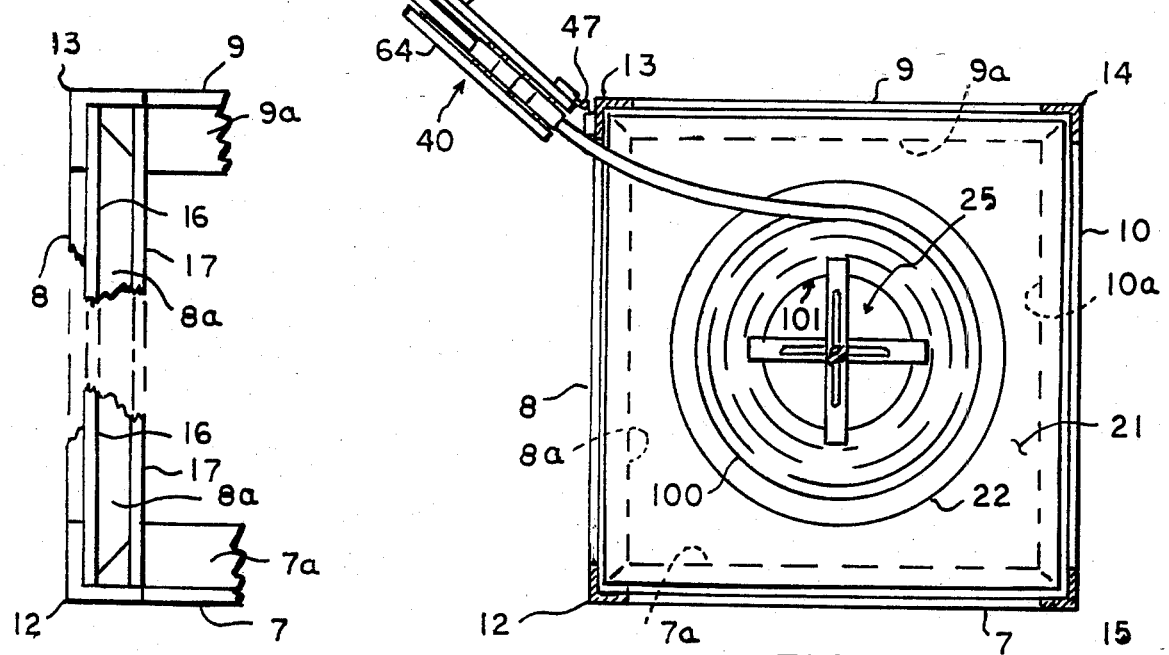
FIG 3
FIG 2

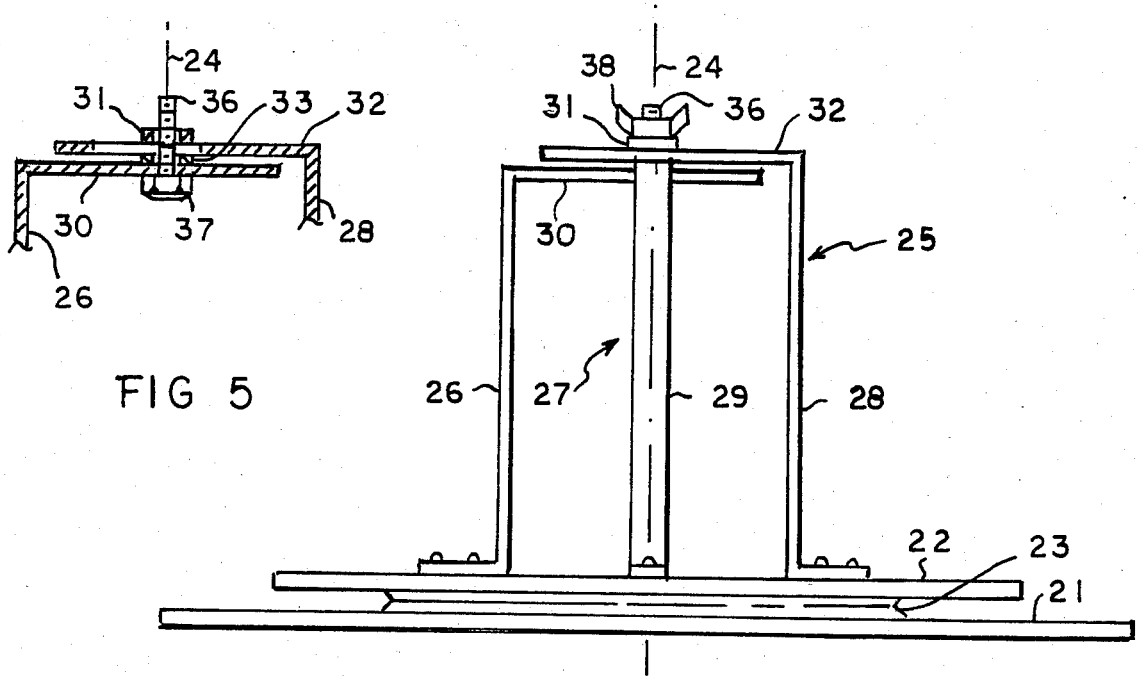
FIG 5
FIG 4
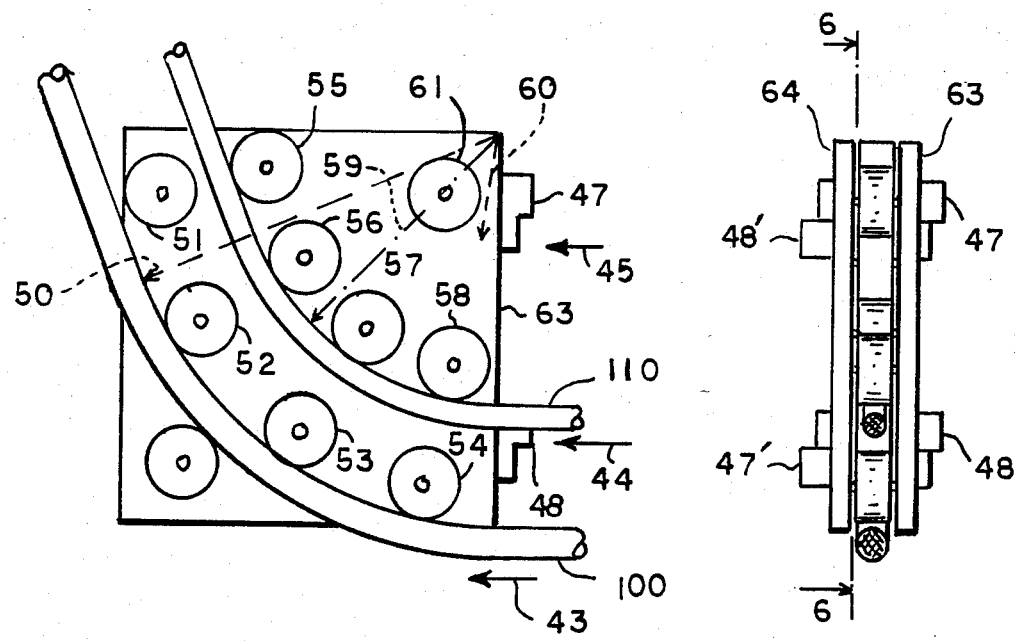
FIG 6
FIG 7

CABLE DISPENSING APPARATUS

BACKGROUND OF THE INVENTION

The present invention relates to cable or wire dispensing apparatus and more particularly to apparatus for storing, straightening and dispensing cable from a coil of the cable on portable apparatus in situs in a building.

Heretofore internal wires in flexible armored cable (sometimes called BX) and electrical wires in non-metal sheathing (sometimes called Romex) have been stored as coils and dispensed for installation in a building by an electrician who must laboriously straighten spirals in the cable by hand as he lifts or pulls the cable from the center of the box in which the coil of cable is usually stored. The cable must be straight and without spirals for the electrician to install it properly in the building. Furthermore, Romex sometimes incurs kinks (sharp bends) that the electrician must straighten by hand. Thus an electrician spends time on the jobsite straightening the cable before he can begin to pull it through the walls, floor or ceiling of the building.

In the prior art, attempts have been made to provide apparatus used on the jobsite specifically for holding and dispensing cable from the outside of the coil for installation in a building. These have included a rotatable reel for the coil of cable, carried on a fixed base so that the cable is dispensed from the apparatus a few feet above the floor. The prior art apparatus usually includes a drum or tub container for the reel and a mechanism inside the container for securing the coil to the reel. The cable is pulled from the reel throught an aperture in the drum, and in some cases the drum is rotatable on a fixed stand. By pulling the cable from the outside of the coil, rather than the center, it is less likely that spirals will occur. However, spirals do occur, particularly when the cable pull relaxes and kinks in Romex must be straightened by hand.

SUMMARY OF THE INVENTION

It is an object of the present invention to provide apparatus for dispensing cable free of spirals and kinks.

In the prior art, replenishing the coil of cable requires the electrician to open the drum and load a full coil on the reel mechanism inside the drum, and then feed the cable through the aperture and close the drum. It is an object of the present invention to provide apparatus for dispensing cable from one or more coils of cable on interchangeable reels so that replenishing an empty reel is accomplished by simply replacing the empty reel with a full pre-loaded reel. It is a further object to provide such apparatus for holding several such interchangeable cable reels any one of which can play out cable for installation.

The prior art mechanism for securing a coil of cable to a reel is contained within the drum and is an integral part thereof. For that reason, each time the coil is replenished, by the electrician at the jobsite, the coil securing mechanism on the reel must be manipulated to remove any remnants of the spent coil and replace it with a new coil and then secure the new coil for dispensing. It is another object of the present invention to provide the interchangeable cable reels each with a relatively simple mechanism for securing a coil of cable thereto and also providing a convenient handle for carrying the loaded reel to the site where such a pre-loaded reel can replace a spent reel in the apparatus.

The prior apparatus dispenses the cable from the drum through an aperture in the drum at a height two to three feet above the floor at the jobsite. The electrician must then straighten the cable by hand to remove spirals and kinks and then carry the cable that he has pulled and straightened to the top of a wall before inserting and then pulling it through the wall. It is another object of the present invention to provide a cable guide on or within the cable dispensing apparatus that removes spirals and kinks in the cable as it is dispensed. A further object is to provide such guides that can be used in series so that the cable can be pulled horizontally at any height at the jobsite between the floor and the ceiling.

Other novel features and objects of the present invention are apparent from the following description of embodiments of the invention taken in conjunction with the drawings.

DESCRIPTION OF THE DRAWINGS

FIG. 1 is a side view of cable dispensing apparatus for holding two interchangeable, pre-loaded cable coil reels with a coil guide attached for dispensing cable free of spirals and kinks for installation;

FIG. 2 is a top view of the bottom shelf of the apparatus taken as shown in FIG. 1;

FIG. 3 is an enlarged top view of the front portion of the top shelf of the apparatus, taken as shown in FIG. 1, showing the front part of the top shelf;

FIG. 4 is a side view of one of the interchangeable reels;

FIG. 5 is a side cross section view of the adjustable coil rack at the top of the reel assemble showing the overlapping slotted arms that are secured together in position (by a bolt and wingnut) to bear against the inside of a coil of cable held on the reel turntable; and FIGS. 6 and 7 are front and side views of the cable straightening guide carried on the apparatus, the view in FIG. 6 being taken as shown in FIG. 7.

DESCRIPTION OF EMBODIMENTS OF THE INVENTION

The apparatus for dispensing cable such as BX or Romex from a coil of the cable according to the present invention is shown in FIGS. 1 and 2. FIG. 1 is a side view of the apparatus showing the cart 1 which has four caster wheels so that it can roll easily on the floor at the jobsite. The cart is not so large that it will not fit through all full size passageways, doors and openings from area to area of the jobsite.

The floor or bottom shelf 6 of the cart is formed of four pieces of angle (iron or aluminum) defining the front back and sides and connected together so that an inside face of each angle piece forms an edge of the bottom shelf 6. More particularly, the angle pieces 7 to 10 are connected so that their inside faces 7a to 10a, respectively, form the bottom shelf 6 of the cart. The purpose of the shelf is to hold one of the reels that has been pre-loaded with cable to be dispensed.

A second or top shelf 11 is provided directly above the bottom shelf 6, also for holding a loaded reel of cable to be dispensed. For that purpose, vertical corner members 12 and 13 at the front and 14 and 15 at the rear are provided which may also be sections of metal angle stock. Between the two front corners members 12 and 13, at the top thereof, cross bars 16 and 17 are provided for strength and to provide the front edge of the top shelf. Similarly at the rear, crossbars 18 and 19 are provided for strength and to provide the rear edge of the top shelf. At the sides of the cart there may be cross braces like 1a and 1b shown in FIG. 1 located on the outside of the corner members and the base so that they do not get in the way of loading or removing a reel on the bottom shelf through the top of the cart.

Two reels each loaded with a coil of cable are carried on the cart shown in FIG. 1. The first, reel 20 is carried on the bottom shelf and the second, reel 80, is carried on the top shelf. Each of these reels may be identical, although they may carry coils of different size cable as will be explained more fully hereinbelow, and so they are interchangeable, inasmuch as each can be carried either on the top or the bottom shelf of the cart. As can be seen from the description of the cart and in particular the upper shelf, the bottom reel 20 is placed on or removed from the bottom shelf 6 through the top of the cart and so the top shelf 11 and the side supports like 1a and 1b must not get in the way of this action. For example, the bottom reel 20 is removed by first removing the top reel 80 from the top shelf, then grasping the bottom reel at the upper end (coil rack 25) thereof and tilting it front to back sufficiently so that the front of the reel clears the crossbar 17 and the back of the reel clears the crossbar 19 and then lifting the reel straight upward. The reel is inserted into the cart onto the bottom shelf in the same way. Clearly, placing or removing a reel on the bottom shelf is best done by the electrician while standing to the rear of the cart and reaching through the top.

At one verticle corner of the cart, preferable one of the front corners, a cable guide 40 is mounted. The cable is fed through a path in the guide defined by low friction rollers beginning at the end of the guide closest to the reel and emerging at another end thereof. In operation, the electrician pulls the cable from the other end of the guide as it pays out of the reel. The guide tends to straighten the cable, removing curvature of the cable that may tend to cause it to form spirals when the pulling tension is relaxed. The guide also straightens kinks in the cable and it enables the electrician to pull the cable easily, because it passes through the guide on low friction rollers.

When the cable is inserted in the ceiling or top of a wall and then pulled through the ceiling and/or wall, it is convenient and an advantage to provide a second coil guide 70 constructed essentially the same as 40 and having a swivel hook 71 at one corner so that it can be hung from a point above the cart at ceiling height. In that case the cable is fed through both guides in series and is pulled horizontally at ceiling (or top of the wall) height, emerging from the second guide 70 at a point that may be close to the point of insertion. With this arrangement, the cable pulled off the reel is subject to two courses of straightening before installation. Here, again, the electrician can pull the cable easily through the guides on the low friction rollers.

The coil friction rollers in the guide 40 define within the guide several arcuate paths through which the cable may be fed. The arcuate paths may be on different arc radius and the path used depends on the cable. For example, the National Electric Code provides the minimum bending radius for different sizes of BX and Romex cable and an electrician is familiar with them. Therefore, the electrician selects the path depending on the kind and size of cable and does not use a path of smaller arc radius than prescribed by the National Electric Code. Details of the cable guide 40 are described further hereinbelow.

The several different paths of different arc radius through the cable guide 40 are entered at an edge of the guide and the cable emerges (exits) from each path at another edge. The preferred orientation of the guide on the cart is with the paths entrance edges on a line parallel with the reel spool rotation axis 24 (a vertical line as shown in FIG. 1) and the point of exit of each path above the point of entry. With that in mind, it can be seen that the orientation shown in FIG. 1 of the cable guide with the entry points indicated by arrows 43, 44 and 45, one above the other, in that order, can be accomplished by attaching the guide to one of the front corner members of the cart with the entry edge of the guide parallel thereto so that it is parallel to the reel spool rotation axis 24. This is shown also in FIG. 2. Furthermore, it is preferred that the attachment be pivotal so that the cable can be payed out of the guide in whatever forward direction the cable is pulled by the electrician. For this purpose the guide 40 is attached by hinges 47 and 48 at the front of the cart to the front corner member 13.

Similarly, the guide 70 may be suspended from above the cart by its swivel hook 71, so that it can pivot on the hook depending on the direction the electrician pulls the cable through it. And so the two guides 40 and 70 will align in the direction the cable is pulled at any selected height between the floor and ceiling at the jobsite. Clearly, if the electrician pulls the cable payed out from guide 70, the cart (being on wheels) will likely be pulled across the floor until the two guides are disposed one below the other. At that point, the cart will not tend to roll further, because the weight of the cart and the cables it is carrying will easily resist the pull and so the cable will be payed out smoothly from the reel through the two guides 40 and 70 for installation.

The guide 40 is oriented and located on the cart to receive the cable immediately as it is payed out from the outside of the coil held on the reel and so spirals do not occur between the reel and guide. The guide turns the cable upward as shown in FIG. 1 so that the electrician can pull it upward easily and the turn radius through the guide is not less than recommended in National Electric Code. This is the case for BX and Romex. In addition, the guide straightens any kinks that may have occurred in Romex (BX is not likely to kink). The attachment of guide 40 to the cart immediately adjacent the reel is by hinges 47 and 48 on plate 63, or by hinges 47' and 48' on plate 64. This attachment is such that the guide can be oriented as shown in FIG. 1 or upside down. When attached by hinges 47 and 48, the guide turns the cable feed direction upward, or when attached by hinges 47' and 48'. It feeds the cable downward. To accomodate this, each pair of hinges may have easily removable hinge pins or a common removeable pin for both hinges of the pair. This allows the electrician to quickly orient the guide 40 on the cart so that he can pull cable through the guide upward or downward. The guides 40 and 70 may be constructed so that they are interchangeable, each having a pair of hinge parts along both plates along the same edge like guide 40 and an accomodation for attaching a swivel hook at either of two opposite corners like guide 70.

Reel

A reel according to the present invention is shown in FIGS. 4 and 5. It consists of the base or platform 21 that fits on either the lower shelf 6 or the upper shelf 11 of the cart and so platform 21 is the same shape as the shelves and can be placed on or removed from the lower shelf through the top of the cart as described above or it can be held on the top shelf. In this embodiment, the cart is square as viewed from above and so the platform 21 is square.

The turntable 22 is carried on the platform by low friction bearing 23 and the turntable is circular as viewed from above. The axis of rotation of the turntable, axis 24, is centered on the platform 21 and perpendicular thereto. The coil rack 25 secures the coil of cable 100 to the turntable and is attached to the turntable and extends upward therefrom essentially parallel to the axis of rotation 24. The turntable 21 and the coil rack 25 fixedly attached thereto form what is referred to herein as the spool and so axis 24 is also the spool axis of rotation.

The coil rack 25 includes four members 26 to 29 arranged regularly around the axis 24 and extending from the turntable 22 essentially perpendicular thereto. The height of these members is sufficient to clear the height of any coil of cable that is loaded on the reel. From each member an arm extends parallel to the turntable across the axis 24 and so the four arms, one from each member, overlap each other where they cross the axis 24. The order of overlap is not critical, however, it is preferred that each two opposing arms, like arms 30 and 32, sandwich one of the other two arms 31 or 33 in between them and likewise for arms 31 and 33. This places arm 30 on the bottom, next is arm 31 or 33, then 32 and then 33 or 31. Each arm except the bottom arm 30 includes a slot that extends from at least the point where the arm crosses the axis 24 when the member of the arm is perpendicular to the turntable, to near the end of the arm. The slots in arms 31 to 33 are denoted 31' to 33', respectively. The slots accomodate a bolt 36 having a bolt head 37 at one end that is fixed to arm 30 and threadable connects to a wingnut 38 at the other end 39. The bolt may be fixed to arm 30 by screwing it into a threaded hole at about the center of the arm. It is preferred that the wingnut be captured by the bolt so that it cannot easily be unscrewed from the end of the bolt. Tightening the wingnut clamps the ends of the arms rigidly together.

The purpose of the arms and their connection by the bolt and wingnut is to enable the coil rack 25 to be made rigid. The slots in the arms allow opposing pairs of the members such as 26 and 28 to be bent outward at the top away from the axis 24, so that they bear against the inside of the coil of cable that is held on the reel. This is shown in FIG. 1 for both of the reels loaded on the cart. As shown, the vertical members of the rack are bent outward so that they bear against the inner face of the coil of cable. For example, reel 20 holds coil 100 and the verticle members 26 and 28 thereof bear against the inside face 101 of the coil. The same holding action is applied by the other two verticle members 27 and 29 of reel 20 and so coil 100 is held securely on the reel. From time to time, as the cable from that coil is payed out from the cart for installation, the vertical members 26 to 29 of the reel 20 can be adjusted by simply loosening the wingnut, increasing the spread of the members 26 to 29 and then tightening the wingnut again.

Cable Guide

The cable guides 40 and 70 are assemblies of pulleys between two plates 63 and 64, the pulleys being arranged between the two plates to guide cable through an arcuate path therein and so remove any kinksin the cable as it is payed out from the reel. As shown in FIG. 1 and FIGS. 6 and 7, the pulleys define three arcuate paths through the guide, each having a different arc radius. As shown particularly in FIGS. 6 and 7, the largest arc radius is provided by pulley wheels 51 to 54 which define a path of arc radius indicated by vector 50. A smaller arc is defined by pulley wheels 55 to 58 of which the arc is indicated by vector 59 and the smallest arc is defined by a single pulley wheel 61 that defines the path of arc radius indicated by vector 60. The paths defined by vectors 50, 59 and 60 are the paths already designated 43, 44 and 45, respectively, discussed hereinabove with respect to FIG. 1. The entrance to each of those paths is through an edge of the guide as shown in FIGS. 6 and 7 and the arc radius of each path is determined to be the minimum bending radius for a particular cable that has been set by the National Electric Code.

The guide has a pair of hinge parts 47 and 48 attached to the edge of plate 63 for pivotal attachment to the cart to feed the cable upward and hinge parts 47' and 48' attached to the corresponding edge of plate 64 for pivotal attachment to the cart to feed the cable downward. The other parts of the pair attached to the cart are attached to front corner member 13 of the cart.

The cable guide constructed as shown in FIGS. 6 and 7 is best used when oriented with respect to the axis of rotation of the reel spool that feeds cable through the guide as shown in FIG. 1. More particularly, the plane of the plates that hold the pulleys in the guide is parallel to the spool rotation axis of the reel. By this orientation, the entrances to the several paths of the guide all along one edge of the guide, one above another when the guide is attached to the cart. As already mentioned, FIG. 1 shows the preferred location of the guide with respect to the reels on the cart for feeding the cable upward (oriented as shown) or downward (oriented upside down to the way it is shown). It is also preferred that the guide be pivotable with respect to the reels so that the cable pulled through the guide can be pulled in a range of directions by merely pivoting the guide on its hinge.

It should be noted that this arrangement of the guide on the cart also permits pulling cable from both reels on the cart at the same time. For example, the lower cable 100 could be pulled through the guide along path 43, while the upper cable 110 is pulled through either path 44 or 45. Similarly, where a second guide is used like guide 70, the two different cables would be pulled through the corresponding paths in that guide, and so the electrician can pull two cables at the same time for installation together along the same course in the walls of the building.

The embodiments described herein include all features of the present invention in specific forms which represent the best known uses of the invention. Hence, those embodiments are to be considered in all respects as illustrative of the features of the invention and not restrictive. Clearly, other specific forms may be practiced without departing from the spirit and essential characteristics of the invention that is set forth in the appended claims.

What is claimed is:
1. Apparatus for dispensing cable from a coil of the cable contained in the apparatus comprising,
(a) a freestanding cart,

(b) at least two interchangeable cable coil holding reels, each including a spool for holding a coil of cable, mounted on a turntable platform, the spool axis of rotation being perpendicular to the plane of said platform, (c) each of said cable coil holding reel platforms has four outside corners providing four points of support therefor, (d) means in said cart providing at least two shelves spaced apart one above another a distance sufficient to clear the height of one of said cable coil holding reels, each of said shelves for holding one said cable coil holding reels at said four points of support therefor, (e) each shelf holding one of said cable coil holding reels in a position from which cable can be dispensed from the outside of said coil held thereby, (f) one of said cart shelves is a bottom shelf that supports one of said cable coil reels at the bottom of said cart, (g) said cart shelves above said bottom shelf thereof being sufficiently open at the center thereof that said cable coil holding reels can be lifted, each from the shelf it is held on, from said cart through said center openings in said shelves above.

2. Apparatus as in claim 1 wherein, (a) all of said cart shelves that are one above another have an opening therethrough for access to the said shelf below and (b) said openings in each of said shelves is sufficiently large that any of said cable coil holding reels containing a coil of cable can be placed on said shelf below by lowering it from above said cart through said opening.

3. Apparatus as in claim 1 wherein, (a) a cable guide is provided having at least one cable path therethrough, said path having an entrance and an exit, (b) said guide being attached to said cart at a position thereon that places said guide path entrance readily accessible to the end of any of the cables dispensed from said cable coil holding reels and (c) said cable path in said cable guide is arcuate and the radius of said arc is not less than the minimum radius turn recommended for said cable pulled therethrough, (d) whereby cable from said held cable coil holding reels is fed into said guide path entrance and out of said guide path exit from which said cable emerges essentially straight.

4. Apparatus as in claim 3 wherein there are more than one of said cable paths in said cable guide, each of which is arcuate and the radius of said arc is not less than the minimum radius turn recommended for said cable pulled therethrough.

5. Apparatus as in claim 3 wherein said cable guide is pivotally attached to said cart, the pivotal axis thereof being adjacent to said path entrance.

6. Apparatus as in claim 3 wherein, there are more than one of said cable paths in said cable guide, the said entrances to said paths are along a path entrance side of said guide and said guide is pivotally attached to said cart, the pivotal axis thereof being adjacent to said path entrance side.

* * * * *